United States Patent
McBride et al.

(10) Patent No.: US 10,926,620 B2
(45) Date of Patent: Feb. 23, 2021

(54) HYBRID TRANSMISSION SYSTEMS INCLUDING CRANKSHAFT INTEGRATED STARTER-GENERATORS

(71) Applicant: FORD GLOBAL TECHNOLOGIES, LLC, Dearborn, MI (US)

(72) Inventors: Thomas McBride, Livonia, MI (US); Megan Gould, Plymouth, MI (US); Duane Allan Lewis, Westland, MI (US); Gregory Montie, White Lake, MI (US); Jason Michael Sanderson, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/416,400

(22) Filed: May 20, 2019

(65) Prior Publication Data
US 2020/0369278 A1    Nov. 26, 2020

(51) Int. Cl.
| | |
|---|---|
| *B60K 6/26* | (2007.10) |
| *B60W 30/18* | (2012.01) |
| *B60K 6/40* | (2007.10) |
| *B60K 6/28* | (2007.10) |
| *B60K 6/48* | (2007.10) |
| *F16H 61/684* | (2006.01) |

(52) U.S. Cl.
CPC .............. *B60K 6/26* (2013.01); *B60K 6/28* (2013.01); *B60K 6/40* (2013.01); *B60K 6/48* (2013.01); *B60W 30/18018* (2013.01); *B60K 2006/4808* (2013.01); *B60K 2006/4816* (2013.01); *B60K 2006/4825* (2013.01); *F16H 61/684* (2013.01)

(58) Field of Classification Search
CPC ... B60K 6/26; B60K 6/28; B60K 6/48; B60K 2006/4808; B60K 2006/4816; B60K 2006/4825
USPC .................. 123/179.1, 179.25; 701/112; 74/6
See application file for complete search history.

(56) References Cited

U.S. PATENT DOCUMENTS

| | | | | |
|---|---|---|---|---|
| 5,103,127 A | * | 4/1992 | Peter ........................ | B60K 6/40 310/113 |
| 6,092,985 A | | 7/2000 | Winkam | |

(Continued)

FOREIGN PATENT DOCUMENTS

| | | | | |
|---|---|---|---|---|
| DE | 102012009237 A1 | * | 11/2012 | ............. H02K 7/006 |
| DE | 102018118749 A1 | * | 2/2020 | ............... H02K 1/30 |

OTHER PUBLICATIONS

DE102018118749A1 (Lindenmaier, J) (Jun. 2, 2020) (Machine Translation) Retrieved from EPO website on Oct. 7, 2020.*

*Primary Examiner* — Mahmoud Gimie
(74) *Attorney, Agent, or Firm* — David B. Kelley; Carlson, Gaskey & Olds

(57) ABSTRACT

This disclosure details transmission systems for electrified vehicles. Exemplary transmission systems may include a crankshaft integrated starter-generator. The crankshaft integrated starter-generator may include an electric machine and an integrated rotor carrier/input shaft assembly. The integrated rotor carrier/input shaft assembly is configured to support the electric machine and provide an interface for mounting the crankshaft integrated starter-generator relative to a torque converter. The torque converter may be mounted to a flange of the integrated rotor carrier/input shaft assembly that is inside the diameter of a rotor of the electric machine.

20 Claims, 5 Drawing Sheets

(56) References Cited

U.S. PATENT DOCUMENTS

| | | |
|---|---|---|
| 6,781,272 B2 | 8/2004 | Kahlon et al. |
| 9,917,482 B2 | 3/2018 | Lindemann et al. |
| 2003/0080637 A1* | 5/2003 | Berhan .................... B60K 6/26 310/67 R |
| 2004/0036373 A1* | 2/2004 | Schutt ...................... B60K 6/26 310/96 |
| 2014/0342873 A1* | 11/2014 | Inoue ........................ B60K 6/48 477/5 |
| 2015/0122606 A1* | 5/2015 | Vogel ..................... B60L 50/16 192/20 |
| 2016/0109010 A1 | 4/2016 | Lindemann et al. |
| 2017/0279327 A1 | 9/2017 | Golka |
| 2018/0058559 A1 | 3/2018 | Pyers et al. |
| 2018/0062469 A1 | 3/2018 | Satyaseelan et al. |
| 2018/0257475 A1 | 9/2018 | Satyaseelan et al. |

* cited by examiner

HYBRID TRANSMISSION SYSTEMS INCLUDING CRANKSHAFT INTEGRATED STARTER-GENERATORS

TECHNICAL FIELD

This disclosure relates to hybrid transmission systems for electrified vehicles, and more particularly to hybrid transmissions systems that include crankshaft integrated starter-generators.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines (e.g., electric motors). Conventional motor vehicles, by contrast, rely exclusively on the internal combustion engine to propel the vehicle. A high voltage traction battery pack typically powers the electric machines and other electrical loads of the electrified vehicle.

Electrified vehicles employ hybrid transmission systems that include both an internal combustion engine and an electric machine for selectively providing torque for driving one or more drive wheels of the vehicle. Traditional hybrid transmission systems are relatively difficult to assemble, and many of the components of hybrid transmission systems are not serviceable once assembled.

SUMMARY

A transmission system according to an exemplary aspect of the present disclosure includes, among other things, an integrated rotor carrier/input shaft assembly, an electric machine including a rotor that is supported by the integrated rotor carrier/input shaft assembly, and a torque converter adjacent to the electric machine. A stud of the torque converter extends through an opening of the integrated rotor carrier/input shaft assembly. The stud interfaces with the opening at a location that is radially inward from the rotor.

In a further non-limiting embodiment of the foregoing transmission system, the integrated rotor carrier/input shaft assembly and the electric machine establish a crankshaft integrated starter-generator of the transmission system.

In a further non-limiting embodiment of either of the foregoing transmission systems, the integrated rotor carrier/input shaft assembly is a monolithic structure that includes a rotor carrier and an input shaft.

In a further non-limiting embodiment of any of the foregoing transmission systems, the rotor of the electric machine is disposed about and supported by a radially outer surface of the rotor carrier.

In a further non-limiting embodiment of any of the foregoing transmission systems, the radially outer surface extends axially between a front flange and a rear flange.

In a further non-limiting embodiment of any of the foregoing transmission systems, the input shaft extends from the rear flange in a direction away from the torque converter.

In a further non-limiting embodiment of any of the foregoing transmission systems, the opening extends through the rear flange of the rotor carrier.

In a further non-limiting embodiment of any of the foregoing transmission systems, a nut is received over the stud to mount the integrated rotor carrier/input shaft assembly to the torque converter.

In a further non-limiting embodiment of any of the foregoing transmission systems, a biasing element is disposed axially between the rotor and a housing of the torque converter.

In a further non-limiting embodiment of any of the foregoing transmission systems, the opening extends through a rear flange of a rotor carrier of the integrated rotor carrier/input shaft assembly.

An electrified vehicle according to another exemplary aspect of the present disclosure includes, among other things, an engine, a front module downstream from the engine, and a crankshaft integrated starter-generator at least partially enclosed by a housing of the front module. The crankshaft integrated starter-generator is operably connected to a crankshaft of the engine. A transmission gearbox is aft of the front module, and a torque converter is located axially between the front module and the transmission gearbox. A stud protrudes from the torque converter and extends in an upstream direction toward the engine. The stud interfaces with the crankshaft integrated starter-generator at a location that is radially inward from an electric machine of the crankshaft integrated starter-generator.

In a further non-limiting embodiment of the foregoing electrified vehicle, the crankshaft integrated starter-generator includes an integrated rotor carrier/input shaft assembly and the electric machine.

In a further non-limiting embodiment of either of the foregoing electrified vehicles, the integrated rotor carrier/input shaft assembly is a monolithic structure that includes a rotor carrier and an input shaft.

In a further non-limiting embodiment of any of the foregoing electrified vehicles, the input shaft is operably connected to the crankshaft of the engine.

In a further non-limiting embodiment of any of the foregoing electrified vehicles, the input shaft extends from a rear flange of the rotor carrier.

In a further non-limiting embodiment of any of the foregoing electrified vehicles, the stud of the torque converter extends through an opening in a rear flange of the rotor carrier.

In a further non-limiting embodiment of any of the foregoing electrified vehicles, a nut is received over the stud to mount the integrated rotor carrier/input shaft assembly to the torque converter.

In a further non-limiting embodiment of any of the foregoing electrified vehicles, a biasing element is disposed axially between a rotor of the electric machine and a housing of the torque converter.

In a further non-limiting embodiment of any of the foregoing electrified vehicles, a position sensor assembly is configured to detect a rotational position of a rotor of the electric machine.

A method according to another exemplary aspect of the present disclosure includes, among other things, balancing a torque converter or a crankshaft integrated starter-generator of a transmission system, balancing the other of the torque converter and the crankshaft integrated starter-generator, aligning a first balancing marking of the torque converter with a second balancing marking of the crankshaft integrated starter-generator, and mechanically mounting together the torque converter and the crankshaft integrated starter-generator.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details transmission systems for electrified vehicles. Exemplary transmission systems may include a crankshaft integrated starter-generator. The crankshaft integrated starter-generator may include an electric machine and an integrated rotor carrier/input shaft assembly. The integrated rotor carrier/input shaft assembly is configured to support the electric machine and provide an interface for mounting the crankshaft integrated starter-generator relative to a torque converter. In some embodiments, the torque converter is mounted to a flange of the integrated rotor carrier/input shaft assembly that is inside the diameter of a rotor of the electric machine. These and other features are discussed in greater detail in the following paragraphs of this detailed description.

Figure 1:
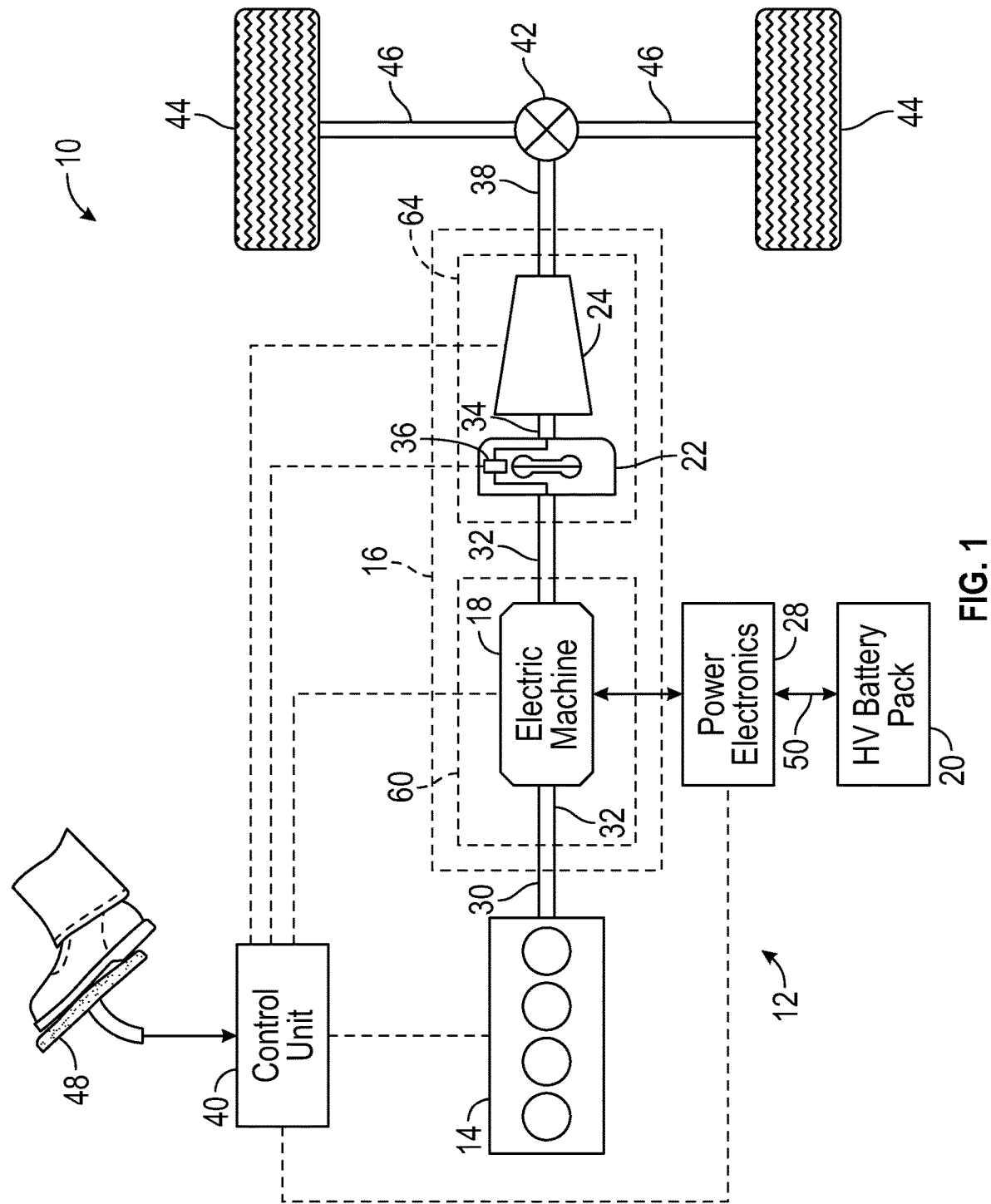
FIG. 1 schematically illustrates an exemplary powertrain of an electrified vehicle.

FIG. 1 schematically illustrates an electrified vehicle 10. Although illustrated as a hybrid electric vehicle (HEV) in some embodiments, this disclosure may be applicable to various other types of electrified vehicles. In addition, although a specific component relationship is illustrated in FIG. 1, this illustration is not intended to limit this disclosure. In other words, it should be readily understood that the placement and orientation of the various components of the electrified vehicle 10 could vary within the scope of this disclosure.

The exemplary electrified vehicle 10 includes a powertrain 12. The powertrain 12 may include an engine 14 and a transmission system 16 that is selectively driven by the engine 14. In an embodiment, the transmission system 16 is a modular hybrid transmission (MHT). The transmission system 16 may include an electric machine 18 that is powered by a high voltage battery pack 20, a torque converter 22, and a multiple-step ratio automatic transmission, or gearbox 24. In an embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for propelling the electrified vehicle 10. The engine 14 generally represents a power source that may include an internal combustion engine such as a gasoline, diesel, or natural gas powered engine, or a fuel cell. In an embodiment, the engine 14 is started using torque that is generated by the electric machine 18.

The electric machine 18 may be any one of a plurality of types of electric machines. In an embodiment, the electric machine 18 is a permanent magnet synchronous motor.

Power electronics 28 are configured to condition direct current (DC) power provided by the battery pack 20 to the requirements of the electric machine 18, as is discussed more particularly below. For example, the power electronics 28 may provide three-phase alternating current (AC) to the electric machine 18.

The electric machine 18 may operate as a generator to convert rotational energy provided by crankshaft 30 of the engine and an input shaft 32 of the electric machine 18 into electrical energy to be stored in the battery pack 20. The input shaft 32 may extend through the electric machine 18. The electric machine 18 is continuously drivably connected to the input shaft 32.

The electric machine 18 is connected to the torque converter 22 via the input shaft 32. The torque converter 22 is therefore operably connected to the engine 14. The torque converter 22 includes an impeller fixed to the input shaft 32 and a turbine fixed to a transmission input shaft 34. The torque converter 22 thus provides a hydraulic coupling between the input shaft 32 and the transmission input shaft 34.

The torque converter 22 is adapted to transmit power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with the torque converter 22 is but a non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 may also be referred to as a final drive. The differential 42 drives a pair of wheels 44 via respective axles 46 that are connected to the differential 42. In an embodiment, the differential 42 transmits approximately equal torque to each wheel 44 while permitting slight speed differences, such as when the vehicle turns a corner. Different types of differentials or similar devices may be used to distribute torque from the powertrain 12 to one or more of the wheels 44. In some applications, torque distribution may vary depending on the particular operating mode or condition, for example.

The powertrain 12 may additionally include an associated control unit 40. While schematically illustrated as a single controller, the control unit 40 may be part of a larger control system and may be controlled by various other controllers throughout the electrified vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery pack 20, selecting or scheduling transmission shifts, etc. In an embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As schematically illustrated in FIG. 1, the control unit 40 may communicate signals to and/or from the engine 14, the electric machine 18, the torque converter bypass clutch 36, the transmission gearbox 24, and/or other components. Although not explicitly illustrated, those of ordinary skill in the art will recognize various functions or components that may be controlled by the control unit 40 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for torque converter bypass clutch 36 and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the electrified vehicle 10 to provide a demanded torque, power, or drive command to propel the electrified vehicle 10. In general, depressing and releasing the accelerator pedal 48 generates an accelerator pedal position signal that may be interpreted by the control unit 40 as a demand for increased power or decreased power, respectively. Based at least upon input from the accelerator pedal 48, the control unit 40 may command torque from the engine 14 and/or the electric machine 18. The control unit 40 also controls the timing of gear shifts within the transmission gearbox 24, as well as engagement or disengagement of the torque converter bypass clutch 36. The torque converter bypass clutch 36 can be modulated across a range between the engaged and the disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the electrified vehicle 10 with the engine 14, engine torque is transferred to the electric machine 18, and then from the electric machine 18 through the torque converter 22 and the transmission gearbox 24. The electric machine 18 may assist the engine 14 by providing additional power to turn the crankshaft 30. This operation mode may be referred to as a "hybrid mode" or an "electric assist mode."

In any mode of operation, the electric machine 18 may act as a motor and provide a driving force for the powertrain 12. Alternatively, the electric machine 18 could act as a generator and convert kinetic energy from the electrified vehicle 10 into electric energy to be stored in the battery pack 20. The electric machine 18 may act as a generator while the engine 14 is providing propulsion power for the electrified vehicle 10, for example. The electric machine 18 may additionally act as a generator during times of regenerative braking in which rotational energy from spinning the wheels 44 is transferred back through the transmission gearbox 24 and is converted into electrical energy for storage in the battery pack 20.

It should be understood that highly schematic depiction of FIG. 1 is merely exemplary and is not intended to be limiting on this disclosure. Other configurations are additionally or alternatively contemplated, and the teachings of this disclosure could be applied to any type of electrified vehicle having any type of transmission system.

Figure 2:
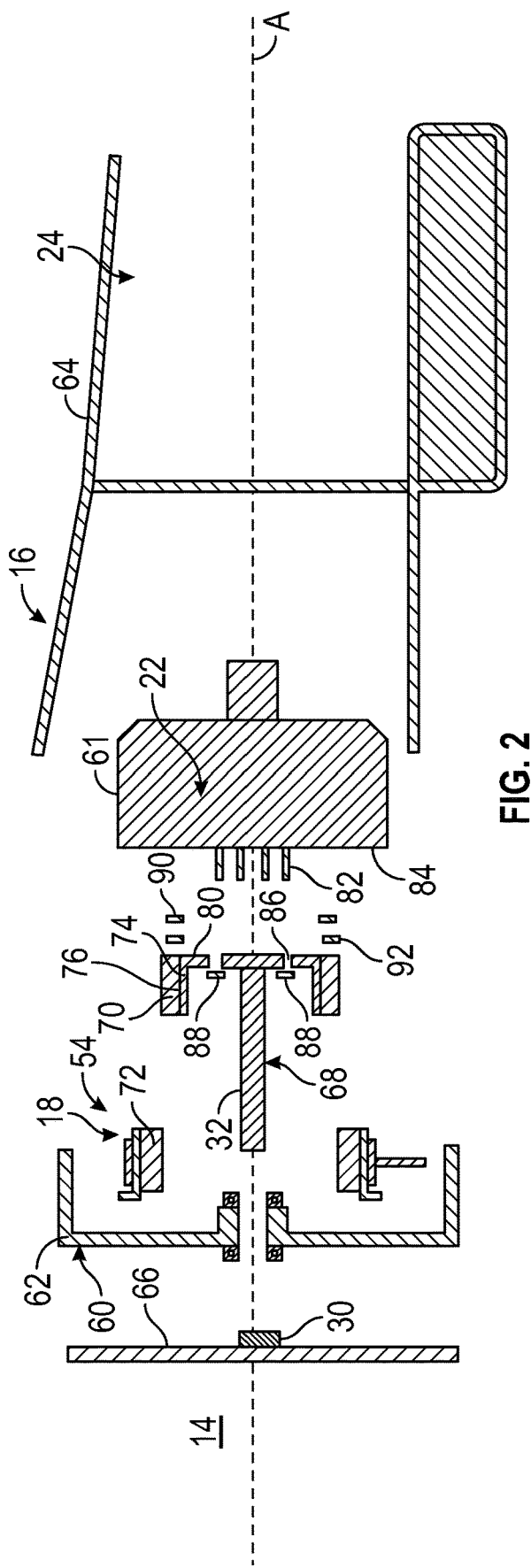
FIG. 2 is an exploded, cross-sectional view of a transmission system of an electrified vehicle.
Figure 3:
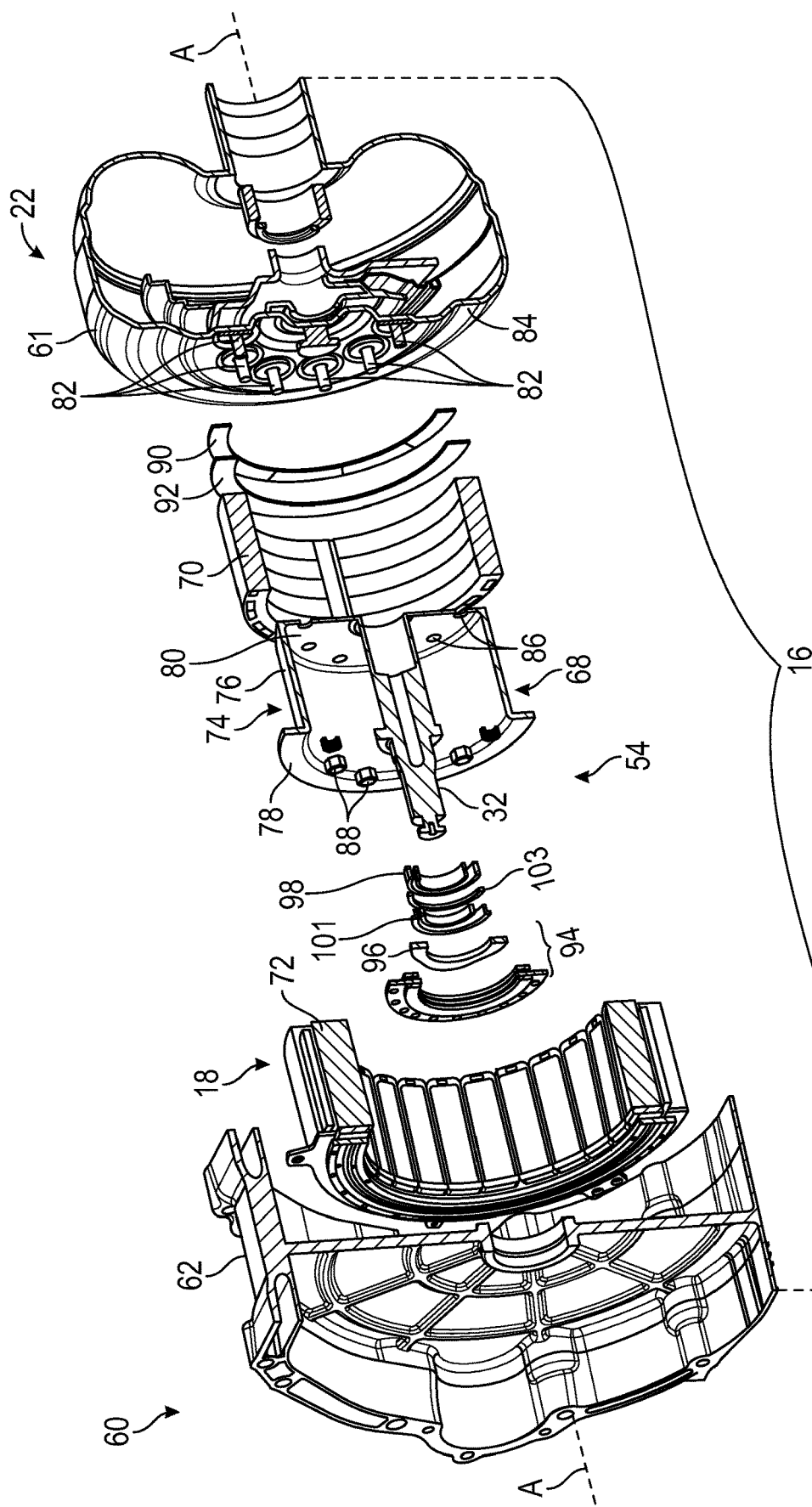
FIG. 3 is an exploded, perspective view of select portions of the transmission system of FIG. 2.
Figure 4:
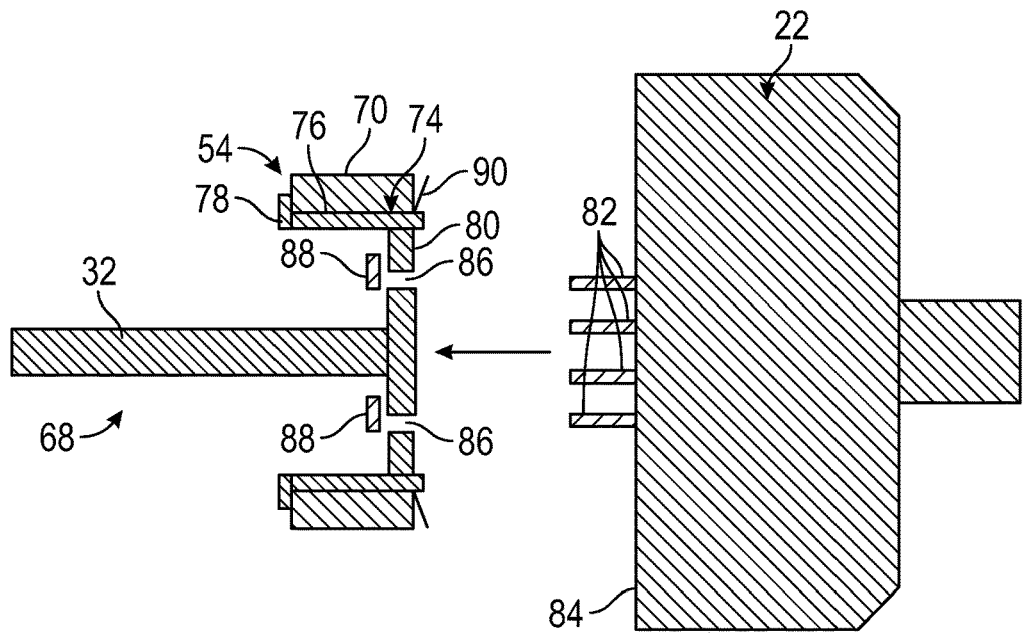
FIG. 4 is an exploded, cross-sectional view of an interface between an integrated rotor carrier/input shaft assembly and a torque converter of the transmission system of FIG. 2.
Figure 5:
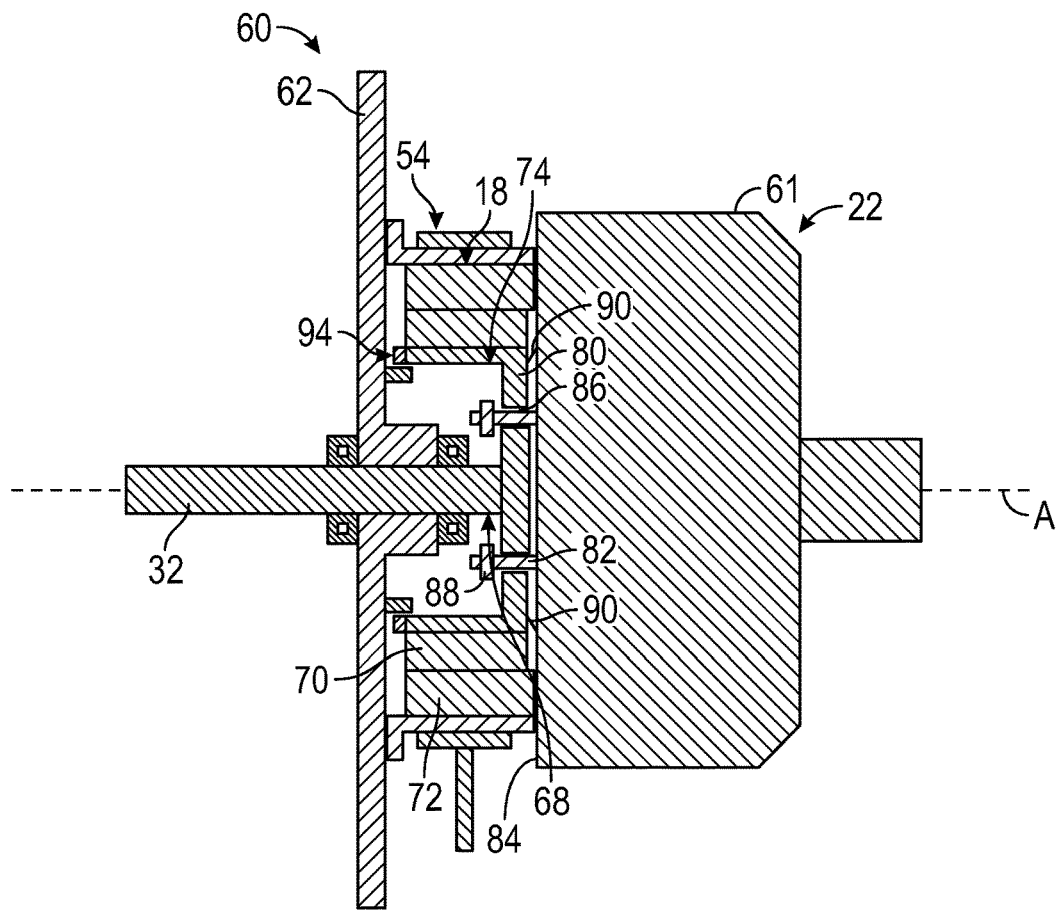
FIG. 5 is an assembled, cross-sectional view of select portions of the transmission system of FIG. 2.

FIG. 2 schematically illustrates a transmission system 16 for an electrified vehicle, such as the electrified vehicle 10 of FIG. 1 or any other electrified vehicle that is equipped with an electric machine 18 capable of selectively supplying torque for assisting with vehicle propulsion. The transmission system 16 is disposed along a longitudinal axis A. The transmission system 16 may include a front module 60 that is disposed axially between an engine 14 and a transmission gearbox 24. In this disclosure, an axial direction of the transmission system 16 extends in parallel with the longitudinal axis A.

A torque converter 22 is disposed axially between the front module 60 and the transmission gearbox 24. The torque converter 22 includes a housing 61 that defines a periphery that is disposed about the longitudinal axis A.

The front module 60 includes a housing 62 that at least partially encloses a crankshaft integrated starter-generator (CISG) 54 of the transmission system 16. In an embodiment, the CISG 54 replaces a disconnect clutch that is utilized in some existing transmission systems. A transmission housing 64 may substantially enclose the transmission gearbox 24 and the torque converter 22. In an embodiment, the housing 62 and the transmission housing 64 cooperate to substantially enclose the CISG 54. Like the housing 61 of the torque converter 22, the housing 62 and the transmission housing 64 each define a periphery that is disposed about the longitudinal axis A.

The CISG 54 is mounted axially between the engine 14 and the torque converter 22. The CISG 54 may be configured for starting the engine 14 in order to bring the engine 14 to a predetermined minimum rotational speed, thereby beginning the ignition and combustion processes necessary for driving the electrified vehicle 10. For example, the CISG 54 may be operably connected to a crankshaft 30 of the engine 14, and the crankshaft 30 may connect to a flywheel 66 of the engine 14. In operation, the CISG 54 drives the flywheel 66, which in turn drives the crankshaft for starting the engine 14.

The CISG 54 may include, among other components, the electric machine 18 and an integrated rotor carrier/input shaft assembly 68 (hereinafter referred to simply as "the integrated assembly 68"). As explained in greater detail below, the integrated assembly 68 is configured for both supporting the electric machine 18 and providing an interface for mounting the CISG 54 relative to the torque converter 22.

The electric machine 18 may include a rotor 70 received within a stator 72. When the electric machine 18 is operated as an electric motor, rotating the rotor 70 about the longitudinal axis A provides torque for acceleration. Alternatively, when the electric machine 18 is operated as a generator, rotating the rotor 70 about the longitudinal axis A can generate electric power. The rotor 70 may rotate in response to a torque input from regenerative braking, for example. The transmission system 16 is designed to be scalable, and therefore the size of the electric machine 18 (e.g., 35 KW, 75 KW, etc.) is not intended to limit this disclosure.

Referring now to FIGS. 2-5, the integrated assembly 68 of the CISG 54 may be constructed as a single piece, monolithic structure. The integrated assembly 68 may include a rotor carrier 74 and an input shaft 32. The rotor carrier 74 may include a radially outer surface 76 that axially extends between a front flange 78 and a rear flange 80. The rotor 70 of the electric machine 18 is disposed about and supported by the radially outer surface 76 of the rotor carrier 74. In an embodiment, the front flange 78 extends radially outward of the radially outer surface 76, and the rear flange 80 extends radially inward of the radially outer surface 76. When mounted within the transmission system 16, the front flange 78 of the rotor carrier 74 faces toward the engine 14, the rear flange 80 of the rotor carrier 74 faces toward the torque converter 22, and the rotor 70 is positioned radially outward of the radially outer surface 76.

The input shaft 32 may extend from the rear flange 80 in an upstream direction toward the engine 14. In an embodiment, the input shaft 32 is integrally formed with the rear flange 80 of the rotor carrier 74. The input shaft 32 is configured to engage the crankshaft 30 of the engine 14, thereby operably connecting the electric machine 18 to the engine 14.

One or more studs 82 may protrude from a front face 84 of the housing 61 of the torque converter 22. In an embodiment, the studs 82 are welded to the front face 84, although other fastening methodologies are also contemplated within the scope of this disclosure. The studs 82 extend in an upstream direction toward the integrated assembly 68 and may be received through one or more openings 86 that are formed through the rear flange 80 of the rotor carrier 74. Therefore, the studs 82 interface with the integrated assembly 68 at a location that is radially inward (e.g., inside the diameter) from the rotor 70 of the electric machine 18. A nut 88 may be secured over each stud 82 in order to mount the integrated assembly 68 to the torque converter 22, thereby operably connecting the torque converter 22 to the engine 14.

In an embodiment, each opening 86 of the rear flange 80 receives a single stud 82. The total number of studs 82 of the torque converter 22 and the total number of openings 86 of the rear flange 80 are not intended to limit this disclosure.

The transmission system 16 may additionally include a biasing element 90. In an embodiment, the biasing element 90 is a Belleville washer, although other biasing elements are also contemplated within the scope of this disclosure. The biasing element 90 may be axially disposed between a backing plate 92 (best shown in FIG. 3) of the electric machine 18 and the housing 61 of the torque converter 22. Once the integrated assembly 68 is mounted to the torque converter 22 by the studs 82 and the nuts 88, the biasing element 90 is configured to apply an axial compressive load against the integrated assembly 68 and the rotor 70 for retention.

The transmission system 16 may additionally include a position sensor assembly 94. The position sensor assembly 94 may include a position sensor 96. In an embodiment, the position sensor 96 is a resolver that is configured for measuring rotation of the rotor 70. A shaft bearing 98, input seal 101, and snap ring 103 may seal the interface between the housing 62 of the front module 60 and the input shaft 32.

Figure 6:
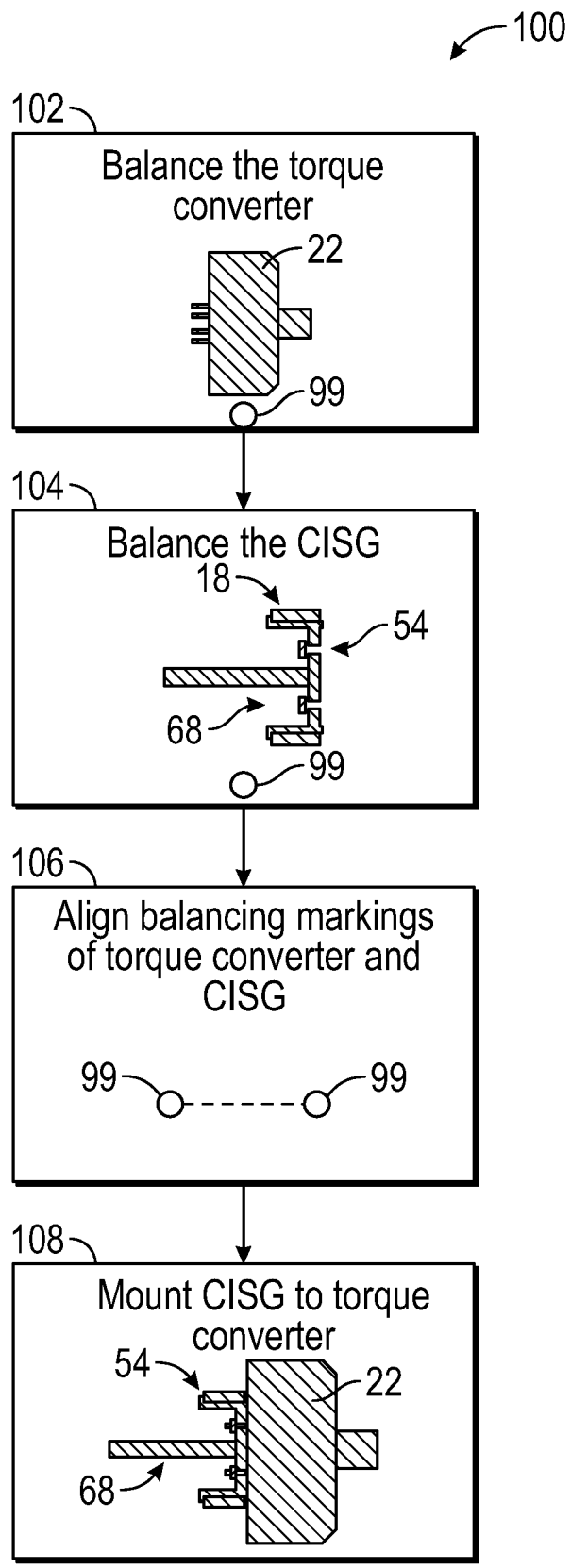
FIG. 6 schematically illustrates a method for assembling a transmission system.

FIG. 6, with continued reference to FIGS. 1-5, schematically illustrates a method 100 for assembling portions of the transmissions system 16 of the electrified vehicle 10. The CISG 54 (e.g., electric machine 18/integrated assembly 68) and the torque converter 22 are rotating components and therefore these component must be balanced in order to be properly centered about the longitudinal axis A.

Accordingly, the method 100 may include balancing the torque converter 22 at block 102 and separately balancing the CISG 54 at block 104. The order in which these components are balanced is not intended to limit this disclosure, and therefore the CISG 54 could alternatively be balanced prior to the torque converter 22.

The balancing operations of blocks 102 and 104 may include locating the point of maximum radial force variation or the point of lightest weight and then marking that location with a balancing marking 99. In an embodiment, the balancing markings 99 may be red or yellow dots. However, the color and configuration of the balancing markings 99 are not intended to limit this disclosure.

The method 100 may next proceed to block 106, wherein the balancing marking 99 of the CISG 54 may be aligned with the balancing marking 99 of the torque converter 22. While maintaining this alignment, the CISG 54 may be mounted (e.g., mechanically fastened) to the torque converter 22 at block 108. By balancing the electric machine 18/integrated assembly 68 and the torque converter 22 separately in the manner described above, these components are able to be maintained separately and are serviceable unlike prior hybrid transmission designs.

The exemplary transmission systems of this disclosure replace a traditional engine disconnect clutch with an integrated rotor carrier/input shaft assembly that is mechanically fastened to a torque converter housing. The proposed transmission systems remove the costly balancing operations that are typically associated with the rotor/input shaft assembly and the torque converter and also remove the costly rotor retention process. The proposed transmission systems are additionally scalable by increasing the diameter of the electric machine without increasing the axial length and are serviceable unlike prior systems.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A transmission system, comprising:
an integrated rotor carrier/input shaft assembly;
an electric machine including a rotor that is supported by the integrated rotor carrier/input shaft assembly;
a torque converter adjacent to the electric machine; and
a stud of the torque converter extending through an opening of the integrated rotor carrier/input shaft assembly,
wherein the stud interfaces with the opening at a location that is radially inward from the rotor,
wherein an input shaft of the integrated rotor carrier/input shaft assembly is a separate shaft from a transmission input shaft of a transmission gearbox.

2. The transmission system as recited in claim 1, wherein the integrated rotor carrier/input shaft assembly and the electric machine establish a crankshaft integrated starter-generator of the transmission system.

3. The transmission system as recited in claim 1, wherein the integrated rotor carrier/input shaft assembly is a monolithic structure that includes a rotor carrier and an input shaft.

4. The transmission system as recited in claim 1, wherein the rotor of the electric machine is disposed about and supported by a radially outer surface of the rotor carrier, and wherein the radially outer surface extends axially between a front flange and a rear flange, and further wherein the front flange extends radially outward of the radially outer surface and the rear flange extends radially inward of the radially outer surface.

5. The transmission system as recited in claim 4, wherein the input shaft is integrally formed with the rear flange and extends from the rear flange in a direction away from the torque converter.

6. The transmission system as recited in claim 4, wherein the opening extends through the rear flange of the rotor carrier.

7. The transmission system as recited in claim 1, comprising a nut received over the stud to mount the integrated rotor carrier/input shaft assembly to the torque converter.

8. The transmission system as recited in claim 1, comprising a Belleville washer disposed axially between the rotor and a housing of the torque converter.

9. The transmission system as recited in claim 1, wherein the opening extends through a rear flange of a rotor carrier of the integrated rotor carrier/input shaft assembly.

10. The transmission system as recited in claim 1, wherein the stud is welded to a front face of a housing of the torque converter, and further comprising a nut received over the stud and received against a front face of a rear flange of a rotor carrier of the integrated rotor carrier/input shaft assembly.

11. The transmission system as recited in claim 8, wherein the Belleville washer is axially disposed between a backing plate of the electric machine and the housing of the torque converter.

12. An electrified vehicle, comprising:
an engine;
a front module downstream from the engine;
a crankshaft integrated starter-generator at least partially enclosed by a housing of the front module,
wherein the crankshaft integrated starter-generator is operably connected to a crankshaft of the engine;
a transmission gearbox aft of the front module;
a torque converter located axially between the front module and the transmission gearbox; and
a stud protruding from the torque converter and extending in an upstream direction toward the engine, wherein the stud interfaces with the crankshaft integrated starter-generator at a location that is radially inward from an electric machine of the crankshaft integrated starter-generator, wherein the crankshaft integrated starter-generator includes an integrated rotor carrier/input shaft assembly and the electric machine, and further wherein the integrated rotor carrier/input shaft assembly is a monolithic structure that includes a rotor carrier and an input shaft, wherein the input shaft of the integrated rotor carrier/input shaft assembly is a separate shaft from a transmission input shaft of the transmission gearbox.

13. The electrified vehicle as recited in claim 12, wherein the input shaft is operably connected to the crankshaft of the engine.

14. The electrified vehicle as recited in claim 12, wherein the input shaft extends from a rear flange of the rotor carrier and is integrally formed with the rear flange.

15. The electrified vehicle as recited in claim 12, wherein the stud of the torque converter extends through an opening in a rear flange of the rotor carrier.

16. The electrified vehicle as recited in claim 12, comprising a nut received over the stud to mount the integrated rotor carrier/input shaft assembly to the torque converter.

17. The electrified vehicle as recited in claim 12, comprising a Belleville washer disposed axially between a rotor of the electric machine and a housing of the torque converter.

18. The electrified vehicle as recited in claim 12, comprising a position sensor assembly configured to detect a rotational position of a rotor of the electric machine.

19. The transmission system as recited in claim 1, wherein the torque converter is disposed downstream from the electric machine and is axially between the electric machine and the transmission gearbox of the transmission system.

20. A method, comprising:

balancing a torque converter or a crankshaft integrated starter-generator of a transmission system;

balancing the other of the torque converter and the crankshaft integrated starter-generator;

aligning a first balancing marking of the torque converter with a second balancing marking of the crankshaft integrated starter-generator; and mechanically mounting together the torque converter and the crankshaft integrated starter-generator.

* * * * *